United States Patent
Hong et al.

(10) Patent No.: US 6,766,380 B1
(45) Date of Patent: Jul. 20, 2004

(54) TWO-BYTE DOMAIN NAME SERVER SYSTEM FOR DOMAIN NAMES IN LANGUAGES OTHER THAN ENGLISH

(75) Inventors: Seung Kuk Hong, Teigu Gunguk (KR); Ja Yeol Ku, Teigu Gunguk (KR); Won Hwa Hong, Teigu Gunguk (KR); Jae Hyun Kim, Seoul (KR)

(73) Assignee: Hannic Corporation, Teigu Gunguk (KR)

( * ) Notice: Subject to any disclaimer, the term of this patent is extended or adjusted under 35 U.S.C. 154(b) by 704 days.

(21) Appl. No.: 09/641,161

(22) Filed: Aug. 17, 2000

(30) Foreign Application Priority Data

Jan. 28, 2000 (KR) .................................... 2000-0004320

(51) Int. Cl.[7] ............................................... G06F 15/16
(52) U.S. Cl. ...................... 709/245; 709/223; 709/225; 709/226; 709/227; 709/228; 709/238
(58) Field of Search ............................... 709/226, 223, 709/225, 227, 228, 238, 245

(56) References Cited

U.S. PATENT DOCUMENTS

| | | | | |
|---|---|---|---|---|
| 5,793,381 A | * | 8/1998 | Edberg et al. | 345/467 |
| 6,104,711 A | * | 8/2000 | Voit | 370/352 |
| 6,108,703 A | * | 8/2000 | Leighton et al. | 709/226 |
| 6,131,095 A | * | 10/2000 | Low et al. | 707/10 |
| 6,161,008 A | * | 12/2000 | Lee et al. | 455/415 |
| 6,182,148 B1 | * | 1/2001 | Tout | 709/245 |
| 6,314,469 B1 | * | 11/2001 | Tan et al. | 709/245 |

FOREIGN PATENT DOCUMENTS

WO      WO99/40517     *   8/1999

OTHER PUBLICATIONS

Nikkei Communications, Dec. 6, 1999.

* cited by examiner

*Primary Examiner*—Nabil El-Hady
(74) *Attorney, Agent, or Firm*—Norris McLaughlin & Marcus P.A.

(57) ABSTRACT

Two byte domain name server system is discloses for obtaining an IP address corresponding to a domain query in a language other than English. The domain query is given to a node server, having a cache memory, where it is decoded and a relevant IP address corresponding to the domain is sought out from an own database in the cash memory, if any. In case the relevant IP address has not been recorded in the database, the node server judges if the query is in a language other than English or in English. In case that the query is not in English, the node server transfers the query to a route server and sends the answer from the route server back to the user, and records the relevant IP address sought out in the route server in the database of the cash memory for a certain time period. The route server has its own database where domain names in a language other than English and information, for instance, IP address, registrar's information, property information of the registered domain name, etc., are recorded. While, in case the query is in English, the node server transfers the query to another conventional route server having an English domain name serving system.

1 Claim, 3 Drawing Sheets

TWO-BYTE DOMAIN NAME SERVER SYSTEM FOR DOMAIN NAMES IN LANGUAGES OTHER THAN ENGLISH

BACKGROUND OF THE INVENTION

1) Field of the Invention

The present invention relates to a two-byte domain name server system, by which IP addresses on Internet sites can be obtained with the aid of a two-byte code so that users can use domain names in languages other than English to connect their computers to the desired Internet sites. The present invention, particularly relates to a two-byte domain name server system, having its purpose to make a previously used domain name server system operating in English, work with other languages.

2) Related Art Statement

On a large network, like the Internet, innumerable number of computer systems are connected In order to identify these systems, an identification number, i.e. IP address, is given to each of the computer systems. For the IP addresses, four groups of digits divided by periods, e.g. 203.244.148.81, are used. However, it is almost impossible for people to memorize many IP addresses on the Internet; therefore, a Domain Name Server system is constructed for the convenience of users. According to the DNS system, an English name which matches with the IP address is used.

When seeking for a certain computer system connected to the Internet, i.e. a website, using such a Domain Name Server system, a user should enter the English domain name of the website, to which he wishes to connect his computer, by filling the blanks to enter the website address. A matching operation between the domain name to the corresponding IP address is then performed in the Domain Name Server system, and the user's computer is then connected to the relevant website.

An example showing the connection of a user's computer to a desired website using the English Domain Name, will be explained below, where a person using Korean as his mother language tries to access to a website.

In a case where a user wishes to connect his computer to the website of "Joongangilbo" (Chuo Nippo), he has to enter the domain name "http:www.joongang.co.kr" into the web browser, or to the website of Korean President House he is required to enter "http:www.cwd.co.kr".

However, as mentioned above, the domain names are recorded in Romanized Alphabet where the Korean pronunciation is expressed as it is. Therefore, it is difficult for Korean people, who use Hangul as a mother language, to correctly record or memorize the domain name. Further, in a case where an English abbreviation is used for the domain name, it is almost impossible to connect a user's computer to the relevant website unless the user knows the original English name correctly,.

While, in the event that a part of the Hangul domain name is mentioned in English in order to simplify the domain name, that is to say, in case that, for example, an abbreviated name "joongang" is used for Joongangilbo (Chuo Nippo), it becomes difficult to know which organization is managing the web site of the abbreviated domain name. On the other hand, if the full name of the organization, for instance, "joongangilbo" is used as the domain name, the domain name is too long for use in a convenient manner. Such an inconvenience is common to all people who do not use English as their mother language, for instance, Korean or Japanese.

In order to solve the problem, many prior server systems are suggested to be able to connect a user's computer system to the relevant web site even if the address entered to a web browser is in with the user's mother tongue. For instance, the domain name server systems, Netpia (netpia.com), Compass (7.co.kr), and Urimal 198, work in such a manner that even if the user enters the domain name in Hangul to a web browser, the relevant website can be sought. However, according to these systems, since the domain name maintains its English base, it is limited to use only in HTTP in the programs of Web, E-mail, Telnet, FTP, etc. out of all the services used in the Internet.

Further, according to these server systems, their own domain name system information is sought. Therefore, no interface through which user can establish a Hangul domain name can be provided, except for data provided from its own program. Furthermore, all queries concerning to the name servers are managed by a single server system. Therefore, other Hangul domain name server systems cannot be recognized and the operating speed becomes slower and the opening of the system is aggravated.

SUMMARY OF THE INVENTION

In order to solve the above mentioned problems, the present invention has for its purpose to provide a two-byte domain name server system where a domain name mentioned in a language other than English corresponds to its IP address in a data base when a user enters a domain name required to be connected to a network in said other language, a domain name is then formatted into data suitable for a 7 bit ASCII system, and an IP address corresponding to the required domain name is sought out with the aid of a domain name server database in languages other than English, for instance, Hangul, then the thus obtained IP address is transferred to the user. According to the system of the present invention, said required IP address corresponding to the Hangul domain name is sought by a distributed system which is linked together, so that when the Hangul domain name server is established in all of the domain name server systems, all the services provided through the Internet become available even if the domain name entered is in Hangul, and no large load is applied on the name server systems.

DETAILED EXPLANATION OF THE PREFERRED EMBODIMENT

A preferred embodiment according to the present invention will be explained below, referring to the attached drawings.

Figure 1:
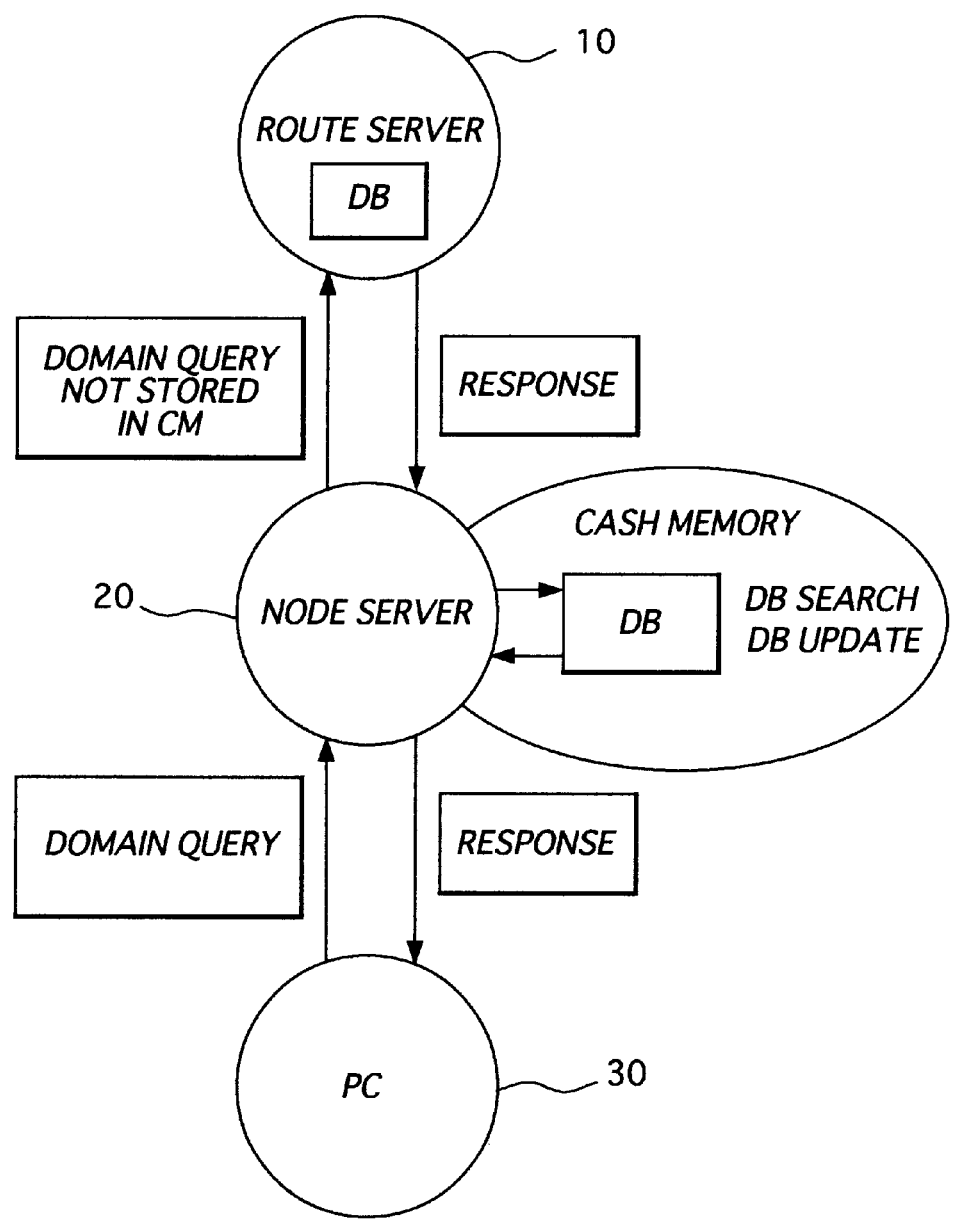
FIG. 1 is a block diagram showing a construction of a Hangul domain name server system according to the present invention.

FIG. 1 is a block diagram showing a construction of a Hangul domain name server system according to the present invention. The system comprises a route server 10, a node server 20 and a user's personal computer system 30. The route server 10 includes its own database (not shown), where Hangul domain names and corresponding information are stored. The corresponding information may include an IP address, registrar's information, property information of the registrar's domain, etc. In the route server (10), when a Hangul domain query is given, the query is decoded and a corresponding IP address is sought out from the Hangul domain database, and is answered. The node server 20 has a cash memory; in case that the domain query is given from the user's computer system 30, the domain query is decoded in the node server, which seeks its own database, i.e. the cash memory. When the domain is recorded in the database, the corresponding IP address is obtained and sent back to the user; while, when the domain is not recorded in the database, a judgement if the query is in Hangul or English is performed in the node server 20. In case that the query is in Hangul, the query is transferred to said route server 10 and the answer from the route server 10 is sent back to the user's computer system 30. It should be noted that when an IP address corresponding to the domain name is transferred from the route server (10), the IP address is recorded in the cash memory, i.e. the node server's own data base, for a predetermined time period. On the other hand, in case that the query given to the node server 20 from the user is not in Hangul, the query is transferred to a known route server where an English domain is dealt with. The user's personal computer system 30 requires a domain query to said node server (20).

Figure 2:
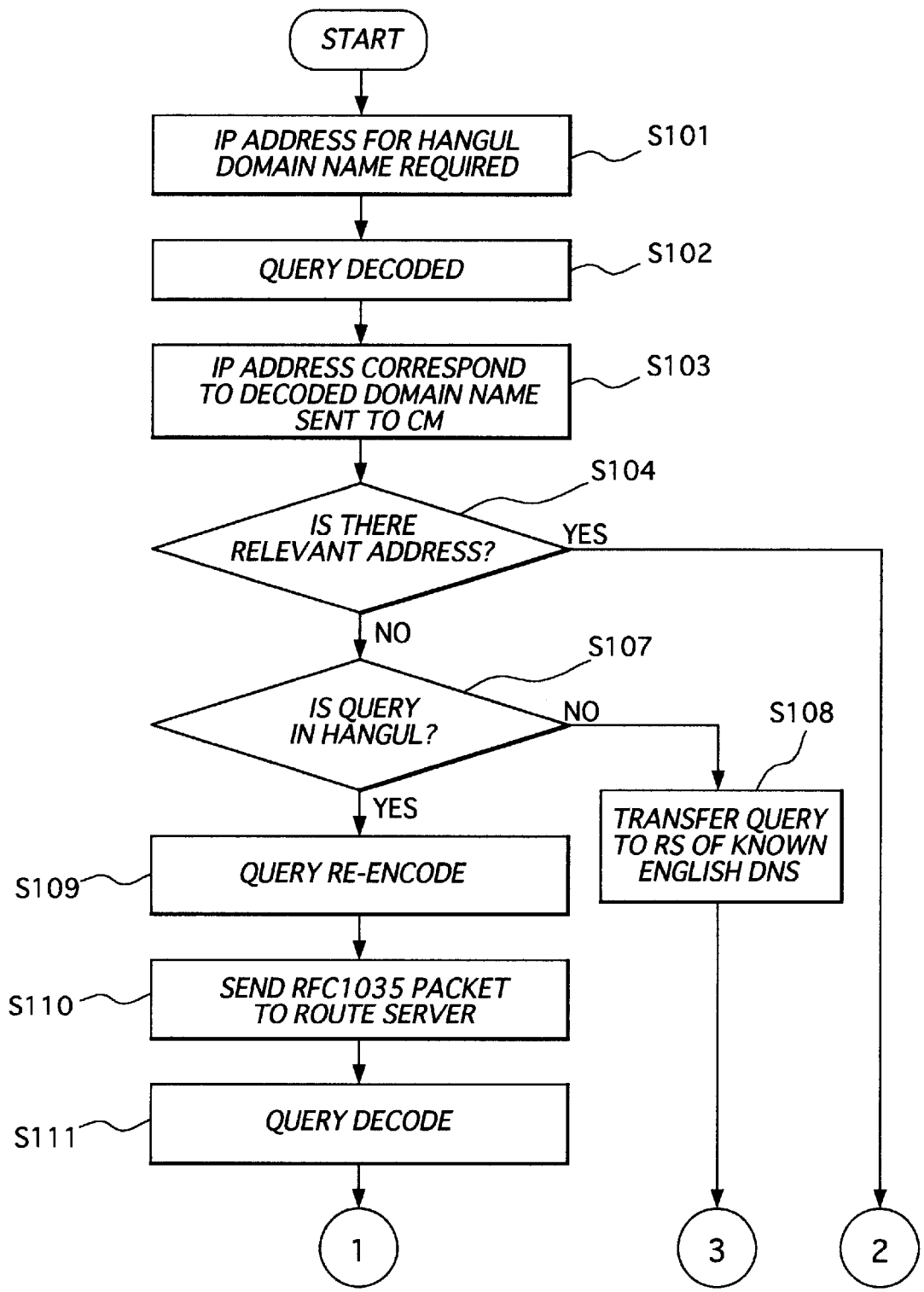
FIGS. 2 and 3 are flow charts showing an operation performed in the Hangul domain name server system according to the present invention.
Figure 3:
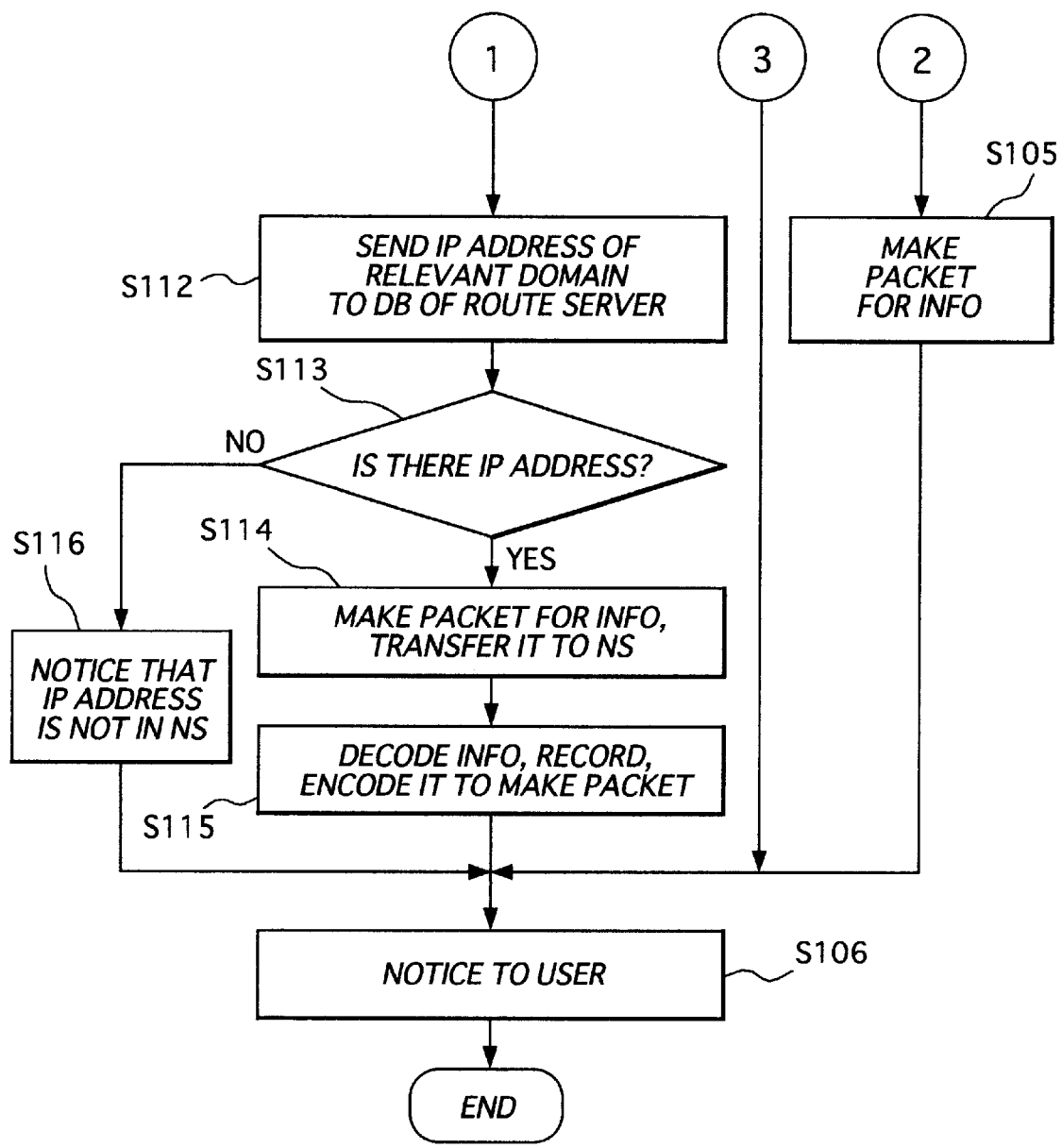

FIGS. 2 and 3 are flow charts showing an operation performed in the Hangul domain name server system according to the present invention.

First, the user requests an IP address corresponding to a certain domain name (Step 101, FIG. 2). The query, i.e. an IP address request of a certain domain name, is decoded in the node server (Step 102, FIG. 2), then a relevant IP address corresponding to the decoded domain name is sent to the cash memory of the node server (Step 103).

The node server 20 then judges if the relevant IP address exists in the cash memory (Step 104, FIG. 2): in case the relevant IP address exists in the cash memory, a packet of RFC1036 for the information is prepared and notified to the user (Step 106, FIG. 3).

In the case that there is no IP address corresponding to the domain name requested by the user in the cash memory, it is judged in the node server 20 whether the query is in Hangul or another language (Step S107, FIG. 2). In case that the query is not in Hangul in Step S107, the node server sends the query to another route server having an English domain name server system of known Internet (Step 108, FIG. 2); then the English route server sends the result of the query to the user's system (Step 106, FIG. 3).

On the other hand, in case that the query is in Hangul, the decoded query is encoded again (Step 109, FIG. 2) and the information thereof is prepared as a packet of RFC1035 and then sent to the route server 10.

Received the query from the node server 20, the route server 10 decodes the query (Step S111, FIG. 2) and sends the relevant IP address corresponding to the decoded Hangul domain name to its own database (Step 11, FIG. 3). The decoded data is judged if the database has such an IP address.

In case that the database of the route server has an IP address corresponding to the Hangul domain name, the route server makes the address in a packet and sends the packet to the node server 20 (Step 114, FIG. 3). In the node server 20, the encoded information is decoded again and the information is recorded in its own cash memory for a certain time period. The information is encoded and changed into a packet again (Step 115, FIG. 3) and then sent back to the user (Step 106, FIG. 3).

In case that the data base of the route server 10 does not have a relevant IP address corresponding to the Hangul domain name in the Steps 113, FIG. 3, the seeking result is notified to the node server 20 (Step 116, FIG. 3), then the node server 20 notifies the result to the user 30 (Step 106, FIG. 3).

In the above-mentioned embodiment, the Hangul domain name system is explained. However, the present invention can be modified for other languages, for instance, Japanese. In this case, IP address, information about the registrar, the property information of the registered domain may recorded in a database in Japanese. That is to say, the present invention can be applied to any language other than English by using a database where information is recorded in the language other than English.

As stated above, according to the invention, domain names in languages other than English, which are suitable for known domain name systems, can be used, so that users can obtain all of the services provided through Internet even if the domain names are other language than English. Further, according to the present invention, a distributed system is used, so that the load applied to the server system becomes small. Users can have a connection to the Internet by a language other than English, therefore all of the services of Telnet, FTP. E-mail etc. provided through the Internet can be obtained with other languages than English because the domain name system works with of such other languages.

What is claimed is:

1. A domain name server system for obtaining an IP address corresponding to a domain name in accordance with a user's request comprising:

a user's computer system;

a route server (10) comprising an own database in which domain names in a language other than English and information corresponding to the domain names are recorded, wherein a domain query in a language other than English is decoded to be sought for an IP address for the domain in said database;

a node server comprising a cash memory including its own database, being connected to said user's computer system, said route server, and other route server for use in English domain names, wherein a domain query from said user's computer system is decoded to be sought for an IP address for the domain; wherein in case that a relevant IP address has been recorded in the database the. IP address is sought out and sent back to the user's computer system, while in case that a relevant IP address has not been recorded in the database it is judged whether the domain query is in a language other than English or in English, and in case the domain query is in a language other than English, the domain query is transferred to said route server and an answer from said route server is sent back to the user's computer system; wherein an IP address from the route server corresponding to the domain name requested by the user is recorded in said own database in the cash memory for a certain time period; wherein in case that the domain query from the user is in English, the domain query is transferred to said other route server for use with English domain names.

* * * * *